US008309229B2

(12) United States Patent
Nakahara et al.

(10) Patent No.: US 8,309,229 B2
(45) Date of Patent: Nov. 13, 2012

(54) POLYESTER RESIN AND THERMOSETTING WATER-BORNE COATING COMPOSITIONS

(75) Inventors: Shuichi Nakahara, Hiratsuka (JP); Hiromi Harakawa, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 1060 days.

(21) Appl. No.: 11/628,956

(22) PCT Filed: Jun. 9, 2005

(86) PCT No.: PCT/JP2005/011005
§ 371 (c)(1),
(2), (4) Date: Dec. 8, 2006

(87) PCT Pub. No.: WO2005/121209
PCT Pub. Date: Dec. 22, 2005

(65) Prior Publication Data
US 2009/0197094 A1 Aug. 6, 2009

(30) Foreign Application Priority Data

Jun. 11, 2004 (JP) .................. 2004-174547

(51) Int. Cl.
*B32B 27/08* (2006.01)
*B32B 27/18* (2006.01)
*B32B 27/26* (2006.01)
*B32B 27/30* (2006.01)
*B32B 27/36* (2006.01)

(52) U.S. Cl. ........ 428/482; 428/480; 428/483; 428/522; 428/402; 428/402.24; 428/403; 428/407; 528/272; 528/297; 528/296; 528/302; 528/365; 528/366

(58) Field of Classification Search .................. None
See application file for complete search history.

(56) References Cited

U.S. PATENT DOCUMENTS

| | | | | |
|---|---|---|---|---|
| 4,085,159 A * | 4/1978 | Marsiat | ........................ | 525/438 |
| 4,147,737 A * | 4/1979 | Sein et al. | ..................... | 525/438 |
| 4,172,822 A * | 10/1979 | Patzschke | ..................... | 524/539 |
| 4,331,573 A * | 5/1982 | Zabrocki et al. | .............. | 524/199 |
| 4,576,990 A * | 3/1986 | Mazaki et al. | ................ | 524/602 |
| 4,789,568 A * | 12/1988 | Matoba et al. | ............. | 427/412.1 |
| 4,833,208 A * | 5/1989 | Miyazono et al. | ............. | 525/285 |
| 4,952,626 A * | 8/1990 | Kordomenos et al. | .......... | 525/28 |
| 5,096,959 A * | 3/1992 | Jones et al. | .................... | 524/600 |
| 5,126,393 A * | 6/1992 | Blum et al. | .................... | 524/538 |
| 5,166,310 A * | 11/1992 | Rooney | ........................ | 528/283 |
| 5,322,865 A * | 6/1994 | Inoue et al. | ..................... | 523/501 |
| 5,525,670 A * | 6/1996 | Nishi et al. | ..................... | 524/512 |
| 5,552,475 A * | 9/1996 | Sundararaman et al. | ..... | 524/608 |
| 5,747,558 A * | 5/1998 | Nishi et al. | ..................... | 523/201 |
| 5,919,856 A * | 7/1999 | Nishi et al. | ..................... | 524/539 |
| 6,139,918 A * | 10/2000 | Irle et al. | ..................... | 427/385.5 |
| 6,309,707 B1 * | 10/2001 | Mayer et al. | ................... | 427/386 |
| 6,458,463 B1 * | 10/2002 | Yoshioka et al. | ............. | 428/450 |
| 6,555,612 B1 * | 4/2003 | Mayer et al. | ................... | 524/501 |
| 6,646,049 B2 * | 11/2003 | Ramesh | ........................ | 525/111 |
| 6,683,137 B2 * | 1/2004 | Kida et al. | ..................... | 525/444 |
| 6,696,539 B2 * | 2/2004 | Kobata et al. | ................... | 528/45 |
| 6,787,188 B1 * | 9/2004 | Metcalfe | ..................... | 427/372.2 |
| 6,849,693 B2 * | 2/2005 | Epple et al. | ..................... | 525/176 |
| 6,998,154 B2 * | 2/2006 | Barsotti et al. | ................ | 427/379 |
| 7,049,370 B2 * | 5/2006 | Lettmann et al. | ............. | 525/131 |
| 7,141,625 B2 * | 11/2006 | Komazaki et al. | ............ | 524/539 |
| 7,495,058 B2 * | 2/2009 | Kitada et al. | ................... | 525/453 |
| 2001/0047057 A1 | 11/2001 | Kitabatake | | |
| 2002/0165335 A1 * | 11/2002 | Kobata et al. | ................... | 528/45 |
| 2003/0125488 A1 * | 7/2003 | Nakahara et al. | ............. | 526/172 |
| 2003/0187125 A1 * | 10/2003 | Okazaki et al. | ............... | 524/500 |
| 2004/0086658 A1 * | 5/2004 | Onoyama et al. | ............. | 427/458 |
| 2004/0228974 A1 * | 11/2004 | Yamane et al. | ............. | 427/372.2 |
| 2008/0095944 A1 * | 4/2008 | Nakahara et al. | .......... | 427/385.5 |

FOREIGN PATENT DOCUMENTS

| | | | |
|---|---|---|---|
| EP | 1 038 934 | * | 9/2000 |
| JP | 58-021421 | * | 2/1983 |
| JP | 03-014869 | | 1/1991 |
| JP | 04-093374 | * | 3/1992 |
| JP | 05-148448 | | 6/1993 |
| JP | 2001-104878 | | 4/2001 |
| WO | WO 2004/106432 | * | 12/2004 |

* cited by examiner

*Primary Examiner* — Vivian Chen
(74) *Attorney, Agent, or Firm* — Wenderoth, Lind & Ponack, L.L.P.

(57) ABSTRACT

The invention discloses specific polyester resins which are obtained by the technique of reacting polyesterpolyol oligomer of specific monomeric composition further with polyvalent carboxylic acid (anhydride) and the like; thermosetting water-borne coating compositions using the polyester resins, and coating film-forming methods using the thermosetting water-borne coating compositions.

21 Claims, No Drawings

POLYESTER RESIN AND THERMOSETTING WATER-BORNE COATING COMPOSITIONS

TECHNICAL FIELD

This invention relates to novel polyester resins which are obtained by unique synthesis technique; water-borne coating compositions which comprise the polyester resins and are capable of forming coating film excelling in performance and finished appearance such as metallic effect; and to coating film-forming methods using the water-borne coating compositions.

BACKGROUND ART

It has been an important task in the field of paint to reduce use amount of organic solvent, for environmental preservation and resource-saving. As a means to accomplish the task of reducing organic solvent content in paint, recently development of water-borne paint and high-solid paint is promoted.

As water-borne paint in the field of automobile coating, for example, a thermosetting water-borne coating composition composed mainly of polyvalent carboxylic acid type resin, amino resin, linear low molecular weight polyesterdiol and benzoin (e.g., see JP Hei 4 (1992)-93374A) is known. However, it has a low solid content, insufficient surface smoothness and unsatisfactory coating film performance such as water resistance.

Of coating compositions for automobiles, particularly top-coating compositions are required to form coating film of excellent appearance and high quality, and in the occasions of metallic coating, it is required to provide highly appealing coating film finish such as metallic effect, by favorably orienting flaky effect pigment such as aluminum in metallic base coating composition.

As a water-borne metallic base coating composition used for such metallic coating, for example, a base coating composition which allows the maximum expression of flip-flop effect of metallic pigment and forms coating film excelling in metallic effect is proposed, which is characterized by containing fine particles of crosslinked polymer in its water-borne base paint (e.g., see JP Hei 3 (1991)-14869B). However, the composition has a defect that it is apt to induce coating film faults such as sagging, unevenness or the like under variation in coating conditions, in particular, that in humidity.

There has been also proposed a coating film-forming method by 2-coat-1-bake system, which used as the paint for water-borne metallic base coating an aqueous dispersion formed by copolymerizing an aqueous dispersion containing fine polymer particles with a specific long chain monomer such as, for example, stearyl acrylate, stearyl methacrylate and the like (e.g., see JP 2001-104878A). The method, however, is subject to such problems as insufficient coating workability and finished appearance such as surface smoothness, metallic effect and the like.

DISCLOSURE OF THE INVENTION

The object of the present invention is to provide thermosetting water-borne coating compositions which exhibit excellent film-forming performance such as water resistance and broad range of coating operation fitness and can form coating film of excellent finished appearance in respect of surface smoothness, metallic effect and the like; and coating film-forming methods.

We have now developed novel polyester resin which is obtained by the technique of reacting a polyesterpolyol oligomer having specific monomeric composition, further with polyvalent carboxylic acid (anhydride); and discovered that the above object could be accomplished by thermosetting water-borne coating compositions using the polyester resin and by coating film-forming methods using the same. The present invention is thus completed.

Accordingly, therefore, the present invention provides a polyester resin having a hydroxyl value within a range of 10-300 mgKOH/g, an acid value within a range of 10-100 mgKOH/g and a number-average molecular weight within a range of 400-6,000, which is obtained by the steps of reacting (a) polyhydric alcohol, (b) polyvalent carboxylic acid and/or polyvalent carboxylic anhydride and (c) monoepoxide compound having long chain hydrocarbon group, and further reacting the resultant polyesterpolyol having a hydroxyl value within a range of 50-600 mgKOH/g and a number-average molecular weight within a range of 300-3,000, with (d) polyvalent carboxylic acid and/or polyvalent carboxylic anhydride and/or (e) polyisocyanate compound.

The invention also provides a thermosetting water-borne coating composition characterized by comprising (A) above-specified polyester resin and (B) crosslinking agent.

The invention furthermore provides methods of forming multi-layered coating film, using the thermosetting water-borne coating composition.

The thermosetting water-borne coating composition according to the present invention forms coating film of excellent performance such as finish and water resistance. In particular, when it is used as a water-borne metallic base coating paint, it can provide high-solid paint and form coating film of excellent finished appearance such as surface smoothness, metallic effect and the like. Still in addition, the thermosetting water-borne coating composition of the present invention achieves an effect of broader range of coating operation fitness under temperature and humidity variation, compared with conventional water-borne coating compositions.

Hereinafter the polyester resin, thermosetting water-borne coating composition and multi-layer coating film-forming methods according to the present invention are explained in further details.

Polyester Resin

The polyester resin (A) of the present invention is obtained by synthesizing a polyesterpolyol (A-1) having a specific monomeric composition, and further reacting this polyesterpolyol (A-1) with (d) polyvalent carboxylic acid and/or polyvalent carboxylic anhydride and/or (e) polyisocyanate compound.

Polyesterpolyol (A-1)

A polyesterpolyol (A-1) is obtained by reaction of (a) polyhydric alcohol, (b) polyvalent carboxylic acid and/or polyvalent carboxylic anhydride and (c) monoepoxide compound having a long chain hydrocarbon group.

Synthesis method of this polyesterpolyol (A-1) is subject to no particular limitation, and can be carried out following conventional practice. For example, it can be synthesized by heating the components (a)-(c) in gaseous nitrogen current, at about 90—about 250° C. for about 5-10 hours, to carry out esterification reaction of the epoxy groups with carboxyl groups and that between the hydroxyl groups and carboxyl groups. Those reactants (a)-(c) may be reacted simultaneously, or in plural stages, i.e., reacting the components (a) and (b) and thereafter reacting the (c) component. In that occasion, a per se known esterification catalyst, such as dibutyltin oxide, antimony trioxide, zinc acetate, manganese acetate, cobalt acetate, calcium acetate, lead acetate, tetrabutyl titanate, tetraisopropyl titanate or the like can be used as a catalyst.

Polyhydric alcohol (a) is a compound having at least two hydroxyl groups per molecule, examples of which include glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, 2-butyl-2-ethyl-1,3-propanediol, neopentyl glycol, neopentyl glycol hydroxypivalate and the like; polyesterdiols such as polylactonediols formed by adding lactones such as ε-caprolactone to above glycols, bis(hydroxyethyl) terephthalate and the like; 1,3-cyclohexane dimethanol, 1,4-cyclohexane dimethanol, tricyclodecane dimethanol, hydrogenated bisphenol A, hydrogenated bisphenol F, spiro glycol, dihydroxymethyl tricyclodecane, glycerine, trimethylolpropane, trimethylolethane, diglycerine, triglycerine, 1,2,6-hexanetriol, pentaerythritol, dipentaerythritol, dipentaerythritol, sorbitol, mannitol and the like. They can be used either singly or in combination of two or more.

Polyvalent carboxylic acid serving as the component (b) is a compound having at least two carboxyl groups per molecule, examples of which include phthalic acid, isophthalic acid, terephthalic acid, succinic acid, adipic acid, azelaic acid, sebacic acid, naphthalene-dicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydro-phthalic acid and the like. They can be used either singly or in combination of two or more.

Polyvalent carboxylic anhydride as the component (b) is a compound having at least one acid anhydride group per molecule, examples of which are anhydrides of above-named polyvalent carboxylic acids. Because two carboxyl groups are formed from one acid anhydride group, one acid anhydride group can be said divalent.

Monoepoxide compound (c) having a long-chain hydrocarbon group signifies a monoepoxide compound having a chain or ring hydrocarbon group having at least 4, preferably 6-20 carbon atoms. Specific examples of such monoepoxide compound (c) include glycidyl esters such as glycidyl pivalate, glycidyl hexanoate, glycidyl cyclohexanecarboxylate, glycidyl 2-ethylhexanoate, glycidyl isononanoate, glycidyl decanoate, glycidyl undecanoate, glycidyl laurate, glycidyl myristate, glycidyl palmitate, glycidyl stearate, CARDURA E10 (Japan Epoxy Resin Co.: monoglycidyl neodecanoate) and the like; glycidyl ethers such as butyl glycidyl ether, phenyl glycidyl ether, decyl glycidyl ether and the like; and α-olefin monoepoxides such as styrene oxide, AOEX24 (Daicel Chemical Industries, Ltd.; α-olefin monoepoxide mixture) and the like.

The hydrocarbon groups having at least 4 carbon atoms may have a substituent such as hydroxyl group. As specific examples of the monoepoxide compound having substituted hydrocarbon group, 1,2-epoxyoctanol, hydroxyoctyl glycidyl ether and the like can be named.

These monoepoxide compounds (c) having long-chain hydrocarbon groups can be used singly or in combination of two or more.

So obtained polyesterpolyol (A-1) has a number-average molecular weight within a range of generally 300-3,000, preferably 400-2,000, inter alia, 400-1,000; and a hydroxyl value within a range of generally 50-600 mgKOH/g, preferably 150-500 mgKOH/g. Where the number-average molecular weight of the polyesterpolyol (A-1) is more than 3,000, it becomes difficult to obtain high-solid coating composition, and where the hydroxyl value is less than 50 mgKOH/g, curability of the composition tends to become unsatisfactory.

In the present specification, number-average molecular weight is the value measured with gel permeation chromatograph ("HLC 8120GPC"; Tosoh Corporation) and converted based on the number-average molecular weight of standard polystyrene. Each test specimen's number-average molecular weight is measured using four columns of "TSKgel G-4000 HXL", "TSKgel G-3000 HXL", "TSKgel G-2500 HXL" and "TSKgel G-2000 HXL" (tradenames, Tosoh Corporation), under the conditions of: mobile phase=tetrahydrofuran, measuring temperature=40° C., flow rate=1 cc/min. and the detecter=IR.

The use ratio of above components (a), (b) and (c) is so selected as to render the hydroxyl value and number-average molecular weight of the resulting polyesterpolyol (A-1) to fall within the above-specified ranges.

In that occasion, preferably a bifunctional or trifunctional alcohol is used as the component (a), and a bifunctional or trifunctional carboxylic anhydride is used as the component (b).

Furthermore, for favorable wettability and compatibility, it is preferred to use as the component (c) a monoepoxide compound having a hydrocarbon group of at least $C_6$, in particular, a glycidyl ester, inter alia, CARDURA E10.

The polyester resin (A) is produced by reacting the polyesterpolyol (A-1) as prepared as above, further with (d) polyvalent carboxylic acid and/or polyvalent carboxylic anhydride, and/or (e) polyisocyanate compound.

In the above production procedure the reaction between the polyesterpolyol (A-1) and the polyvalent carboxylic acid and/or polyvalent carboxylic anhydride (d) can be conducted by condensation reaction of these two components in the accepted manner, for example, by heating them in gaseous nitrogen current at about 150—about 250° C., for about 1-10 hours. In that occasion, catalyst which is same as exemplified for use in preparation of above polyesterpolyol (A-1) can be used.

As the polyvalent carboxylic acid and/or polyvalent carboxylic anhydride (d), those exemplified as to the component (b) can be similarly used.

Also the reaction of polyesterpolyol (A-1) with the polyisocyanate compound (e) can be conducted according to accepted practice, for example, by heating the two components in a gaseous nitrogen current at about 60—about 140° C. for about 1-10 hours, to effect addition reaction between the hydroxyl groups and isocyanate groups. In that occasion, later-described organometallic catalyst (in particular, organotin catalyst) can be used as the catalyst, where necessary.

The polyester resin (A) obtained by reacting the polyesterpolyol (A-1) with polyisocyanate compound (e) has a urethane bond in its skeletal structure, and hence can improve physical properties of the coating film formed therefrom.

As the polyisocyanate compound (e), for example, aliphatic polyisocyanates such as hexamethylene diisocyanate, trimethylhexa-methylene diisocyanate, dimeric acid diisocyanate, lysine diisocyanate and the like; biuret type adducts and isocyanurate ring adducts of these aliphatic polyisocyanates; alicyclic diisocyanates such as isophorone diisocyanate, 4,4'-methylenebis(cyclohexyl isocyanate), methylcyclohexane-2,4- (or -2,6-)diisocyanate, 1,3- (or 1,4-)di-(isocyanatomethyl)cyclohexane, 1,4-cyclohexane diisocyanate, 1,3-cyclopentane diisocyanate, 1,2-cyclohexane diisocyanate and the like; biuret type adducts and isocyanurate ring adducts of these diisocyanates; aromatic diisocyanate compounds such as xylylene diisocyanate, meta-xylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, (m- or p-)phenylene diisocyanate, 4,4'-biphenylene diisocyanate, 3,3'-dimethyl-4,4'-biphenylene diisocyanate, bis(4-isocyanatophenyl)sulfone, isopropylidenebis(4-phenylisocyanate) and the like; biuret type adducts and isocyanurate ring adducts of these diisocyanate compounds; polyisocyanates having at least three isocyanato groups per molecule such as triphenylmethane-4,4'-4"-triisocyanate 1,3,5-triisocyanatobenzene, 2,4,6-triisocyanatotoluene, 4,4'-dimethyldiphenylmethane-2,2', 5,5'-tetraisocyanate and the like; biuret type adducts and isocyanurate ring adducts of these polyisocyanates; urethanated adducts formed by reacting hydroxyl groups of polyols such as ethylene glycol, propylene glycol, 1,4-butylene glycol, dimethylolpropionic acid, polyalkylene glycol, trimethylolpropane, hexanetriol and the like with polyisocyanate compound at a ratio as will make an excessive amount of isocyanato groups; and biuret type adducts and isocyanurate ring adducts of these urethanated adducts can be named.

In the production of the polyester resin (A), when both of the components (d) and (e) are reacted with polyesterpolyol (A-1), either of the component (d) or the component (e) can be the first to be reacted with the polyesterpolyol (A-1). The reactions can be conducted under the conditions similar to those earlier described.

Thus obtained polyester resin (A) can have a number-average molecular weight within a range of generally 400-6,000, preferably 500-5,000, inter alia, 1,000-4,000; a hydroxyl value within a range of generally 10-300 mgKOH/g preferably 30-200 mgKOH/g; an acid value within a range of generally 10-100 mgKOH/g, preferably 20-80 mgKOH/g. When the number-average molecular weight of the polyester resin (A) is more than 6,000, it is difficult for the coating composition prepared with use of said resin (A) to have a high solid content, and when hydroxyl value is less than 10 mgKOH/g, the coating composition tends to have an insufficient curability.

As aforesaid, polyester resin (A) is obtained through condensation reaction of polyesterpolyol (A-1) with component (d) and/or component (e) for further polymerization, which preferably has a number-average molecular weight higher than that of polyesterpolyol (A-1) by 400-2,000, in particular, 700-1,600.

The use rate between the component (A-1) and components (d) and/or (e) and the reaction conditions are so adjusted that the resulting polyester resin (A) can have an acid value, hydroxyl value and number-average molecular weight within the above specified ranges.

In that occasion, as the component (d) at least tri-functional polyvalent carboxylic acid and/or at least trifunctional polyvalent carboxylic anhydride is preferred. In particular, at least one compound selected from trimellitic anhydride, ethylene glycol bis(anhydrotrimellitate), 1,3-propanediol bis(anhydrotrimellitate) and pyromellitic anhydride is convenient.

The polyester resin (A) can be formed into an aqueous resin composition, when dissolved or dispersed in an aqueous medium containing normally 0.3-1.2 equivalents, preferably 0.5-1.0 equivalent to the acid value of the resin of a basic compound. As examples of the basic compound, inorganic basic compound such as hydroxide of alkali metal or aqueous ammonia; and amine compound such as methylamine, dimethylamine, trimethylamine, ethylamine, diethylamine, triethylamine, isopropylamine, diisopropylamine, diethylenetriamine, triethylenetetramine, monoethanolamine, diethanolamine, 2-amino-2-methylpropanol, morpholine, N-methylmorpholine, N-ethylmorpholine, piperazine, dimethylethanolamine, diethylethanolamine, dimethyldodecylamine and the like can be named. Of these, triethylamine, dimethylethanolamine and diethylethanolamine are particularly preferred.

It is important in the present invention that the polyester (A) is synthesized by the procedure comprising first synthesizing a polyesterpolyol (A-1) by reaction of polyhydric alcohol (a), polyvalent carboxylic acid and/or polyvalent carboxylic anhydride (b), and monoepoxide compound (c) having a long chain hydrocarbon group; and then reacting this polyesterpolyol (A-1) further with polyvalent carboxylic acid and/or polyvalent carboxylic anhydride (d) and/or polyisocyanate compound (e).

While it is possible to synthesize a polyester resin having a hydroxyl value, acid value and number-average molecular weight falling within the above-specified ranges and also a monomeric composition similar to that of the polyester resin (A), by such methods as (i) reacting the above components (a)-(d) all at once, or (ii) condensation reacting the components (a)-(c) with the greatest part of the component (d) and thereafter reacting the resulting condensation product with the remainder of the component (d), when the polyester resin prepared by such a method (i) or (ii) is used as the resin of thermosetting water-borne coating composition, the product cannot meet the object of the present invention that it excels in both coating film-forming performance such as water resistance, and finished appearance (in particular, finished appearance such as surface smoothness, metallic effect and the like when formulated into a water-borne metallic base coating composition) and exhibits broad range of coating workable aptitude to temperature and humidity variation.

Thermosetting Water-Borne Coating Compositions

The thermosetting water-borne coating compositions according to the present invention comprise the above-described polyester resin (A) and crosslinking agent (B) as essential components, and further comprise water-dispersible polymer particles (C) where necessary.

Crosslinking Agent (B)

Crosslinking agent (B) for curing the polyester resin (A) of the present invention is subject to no particular limitation. For example, hereafter described blocked polyisocyanate curing agent ($b_1$), water-dispersible blocked polyisocyanate curing agent ($b_2$), melamine resini ($b_3$) and the like can be conveniently used.

Blocked polyisocyanate curing agent ($b_1$) refers to polyisocyanate compound having at least two free isocyanato groups per molecule, with the isocyanato groups blocked with a blocking agent.

As the polyisocyanate compound, for example, aliphatic polyisocyanates such as hexamethylene diisocyanate, trimethylhexa-methylene diisocyanate, dimeric acid diisocyanate, lysine diisocyanate and the like; biuret type adducts and isocyanurate ring adducts of these aliphatic polyisocyanates; alicyclic diisocyanates such as isophorone diisocyanate, 4,4'-methylenebis(cyclohexyl isocyanate), methylcyclohexane-2, 4- (or -2,6-)diisocyanate, 1,3- (or 1,4-)di-(isocyanatomethyl) cyclohexane, 1,4-cyclohexane diisocyanate, 1,3-cyclopentane diisocyanate, 1,2-cyclohexane diisocyanate and the like; biuret type adducts and isocyanurate ring adducts of these alicyclic diisocyanates; aromatic diisocyanate compounds such as xylylene diisocyanate, tetramethylxylylene diisocyanate, tolylene diisocyanate, 4,4'-diphenylmethane diisocyanate (MDI), 1,5-naphthalene diisocyanate, 1,4-naphthalene diisocyanate, 4,4'-toluidine diisocyanate, 4,4'-diphenylether diisocyanate, (m- or p-)phenylene diisocyanate, 4,4'-biphenylene diisocyanate, 3,3'-dimethyl-4,4'-biphenylene diisocyanate, bis(4-isocyanatophenyl)-sulfone, isopropylidenebis(4-phenylisocyanate) and the like; biuret type adducts and isocyanurate ring adducts of these aromatic diisocyanates; hydrogenated MDI and hydrogenated MDI derivatives; polyisocyanates having at least three isocyanato groups per molecule such as triphenylmethane-4,4'-4''-triisocyanate, 1,3,5-triisocyanatobenzene, 2,4,6-triisocyanatotoluene, 4,4'-dimethyldiphenylmethane-2,2',5,5'-tetraisocyanate and the like; biuret type adducts and isocyanurate ring adducts of these polyisocyanates; urethanated adducts formed by reacting hydroxyl groups of polyols such as ethylene glycol, propylene glycol, 1,4-butylene glycol, dimethylolpropionic acid, polyalkylene glycol, trimethylolpropane, hexanetriol and the like with polyisocyanate compound at a ratio as will make an excessive amount of isocyanato groups; and biuret type adducts and isocyanurate ring adducts of these urethanated adducts can be named.

Blocking agent is to temporarily block free isocyanato groups in these polyisocyanate compounds. When the blocked polyisocyanate compounds are heated, e.g., to 100° C. or above, preferably 130° C. or above, the blocking agent dissociates to regenerate free isocyanato groups which can easily react with hydroxyl groups. As such blocking agent, for example, phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid, lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formamidoxime, acetamidoxim, acetoxime, methyl ethyl ketoxime, diacetylmonoxime, benzophenone oxime, cyclohexanone oxime and the like; active methylenes such as malonic acid dialkyl esters, e.g., dimethyl malonate, diethyl malonate, diisopropyl malonate, di-n-butyl malonate, diethyl methylmalonate, benzyl methyl malonate, diphenyl malonate and the like, acetoacetic acid esters, e.g., methyl acetoacetate, ethyl acetoacetate, isopropyl acetoacetate, n-propyl acetoacetate, benzyl acetoacetate, phenyl acetoacetate and the like, acetylacetone; mercaptans such as butyl mercaptan, t-butyl mercaptan, hexyl mercaptan, t-dodecyl mercaptan, 2-mercaptobenzo-thiazol, thiophenol, methyl thiophenol, ethyl thiophenol and the like; acid amides such as acetanilide, acetanisidide, acetotoluide, acrylamide, methacrylamide, acetic amide, stearic acid amide, benzamide and the like; imides such as succinimide, phthalimide, maleimide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethylimidazole and the like; pyrazoles such as 3,5-dimethylpyrazole; ureas such as urea, thiourea, ethyleneurea, ethylenethiourea, diphenylurea and the like; carbamic acid esters such as phenyl N-phenylcarbamate; imines such as ethyleneimine, propyleneimine and the like; and sulfites such as sodium bisulfite, potassium bisulfite and the like can be named.

From the viewpoint of solvent content reduction (VOC reduction) of coating compositions, it is preferable to reduce organic solvent content of also crosslinking agent (B), and for this purpose water-dispersible blocked polyisocyanate curing agent ($b_2$) formed by imparting water-dispersibility to blocked polyisocyanate ($b_1$) within a range not inducing deterioration in the coating film performance can be used.

The water-dispersible blocked polyisocyanate curing agent ($b_2$) includes, for example, blocked polyisocyanate compounds to which water-dispersibility is imparted by blocking isocyanato groups of the polyisocyanate compounds with blocking agent and hydroxy-monocarboxylic acids, and neutralizing the carboxyl groups introduced by the hydroxymonocarboxylic acids.

As the polyisocyanate compounds, those exemplified in respect of blocked polyisocyanate curing agent ($b_1$) can be similarly used. Of those, hexamethylene diisocyanate (HMDI), hexamethylene diisocyanate (HMDI)-derivatives, isophorone diisocyanate (IPDI), isophorone diisocyanate (IPDI)-derivatives, hydrogenated MDI and hydrogenated MDI derivatives are particularly preferred.

Water-dispersible blocked polyisocyanate curing agent ($b_2$) can be prepared by blocking isocyanato groups of polyisocyanate compound with a blocking agent and concurrently reacting it with hydroxymonocarboxylic acid. In that occasion, the reaction is carried out in such manner that at least one of isocyanato groups of the polyisocyanate compound adds to hydroxyl group of the hydroxyl-monocarboxylic acids.

As the blocking agent, those similar to the blocking agents exemplified in respect of the blocked polyisocyanate curing agent ($b_1$) can be used. Also as examples of hydroxymonocarboxylic acids, 2-hydroxyacetic acid, 3-hydroxypropanoic acid, 12-hydroxy-9-octadecanoic acid (ricinoleic acid), 3-hydroxy-2,2-dimethylpropanoic acid (hydroxypivalic acid), 2,2-dimethylolpropionic acid (DMPA) and the like can be named. Of these, 3-hydroxy-2,2-dimethylpropanoic acid (hydroxypivalic acid) is preferred. The reaction can be carried out in a solvent which is inert to isocyanato group, for example, ketones such as acetone or methyl ethyl ketone; esters such as ethyl acetate; or in a solvent like N-methylpyrrolidone (NMP)

Specific examples of melamine resin ($b_3$) include di-, tri-, tetra-, penta- and hexa-methylolmelamines and their alkyletherified compounds (as the alkyl, for example, methyl, ethyl, propyl, isopropyl, butyl, isobutyl, 2-ethylhexyl alcohol and the like can be named). As commercially available melamine resins, for example, "Cymel" series such as Cymel 254 manufactured by Nihon Cytec Industries, "U-VAN" series such as U-VAN20SB manufactured by Mitsui Chemical Co., Ltd. can be used.

When melamine resin ($b_3$) is used as the curing agent, sulfonic acid such as paratoluenesulfonic acid, dodecylbenzenesulfonic acid, dinonylnaphthalenesulfonic acid, and salts of these sulfonic acids with amines which dissociate at baking temperatures of coating films can be used as catalyst.

Water-Dispersible Polymer Particles (C)

Water-dispersible polymer particles (C) which are contained in the thermosetting water-borne coating compositions according to the present invention, where necessary, are subject to no particular limitation, and those customarily used with aqueous resin compositions can be used in similar manner. As preferred examples, aqueous dispersions of acrylic resin, polyester resin (including alkyd resin), epoxy resin, urethane resin and the like can be named. More preferably, all of these should contain hydroxyl groups or carboxyl groups in their molecular structure.

Of these, hereafter described water-dispersible acrylic polymer particles (C-1) and water-dispersible urethane polymer particles (C-2) are particularly preferred and are the optimum for use in water-borne base coating compositions.

Water-Dispersible Acrylic Polymer Particles (C-1)

They are water-dispersible acrylic polymer particles obtained by emulsion polymerizing vinyl monomer in the presence of a dispersion stabilizer such as surfactant, using a radical polymerization initiator.

Water-dispersible acrylic polymer particles (C-1) may have either normal homogeneous structure or multi-layer structure such as core/shell structure, and may be either intraparticulately uncrosslinked type or intraparticulately crosslinked type. Where the particles have core/shell structure, for example, either one of the core portions and shell portions can be made intraparticulately crosslinked type and the other, intraparticulately uncrosslinked type; or both the core and shell portions can be made crosslinked type or uncrosslinked type.

Vinyl monomer to be emulsion polymerized preferably is selected from carboxyl-containing vinyl monomer (M-1), hydroxyl-containing vinyl monomer (M-2) and other vinyl monomer (M-3). Furthermore, by such methods as, for example, concurrently using a minor amount of polyvinyl compound (M-4) having at least two polymerizable unsaturated bonds per molecule; concurrently using each a minor amount of glycidyl-containing vinyl monomer and carboxyl-containing vinyl monomer (M-1); or concurrently using each a minor amount of hydroxyl-containing vinyl monomer, (M-2) and isocyanate-containing vinyl monomer, intraparticulately crosslinked, water-dispersible acrylic polymer particles can be obtained.

Specifically, water-dispersible acrylic polymer particles (C-1) having a core/shell structure can be obtained by, for example, emulsion polymerizing first a vinyl monomeric component containing no or little carboxyl-containing vinyl monomer (M-1), and then continuing the emulsion polymerization after addition of a vinyl monomeric component containing a large amount of carboxyl-containing vinyl monomer (M-1).

Specifically, the core/shell structured water-dispersible acrylic polymer particles (C-1) of crosslinked core type can be obtained, for example, emulsion polymerizing first a vinyl monomeric component containing a minor amount of polyvinyl compound (M-4) and no or little carboxyl-containing vinyl monomer (M-1), and then continuing the emulsion polymerization after addition of a vinyl monomeric component containing a large amount of carboxyl-containing vinyl monomer (M-1).

Binding of the core portion and shell portion can be effected, for example, by copolymerizing polymerizable unsaturated bonds introduced via hydrolysable functional groups or silanol groups which are caused to be present at the core surfaces, or polymerizable unsaturated bonds provided by allyl (meth)acrylate remaining on the core surfaces, with a vinyl monomeric component containing carboxyl-containing vinyl monomer (M-1) (whereby the shell portion is formed).

The carboxyl-containing vinyl monomer (M-1) includes those compounds containing at least one carboxyl group and one polymerizable unsaturated bond per molecule, for example, acrylic acid, methacrylic acid, crotonic acid, maleic acid, itaconic acid and the like. Furthermore, acid anhydrides of those compounds and half-esterified monocarboxylic acids also are covered by the monomer (M-1) as intended in the present specification.

The hydroxyl-containing vinyl monomer (M-2) includes those compounds containing one each of hydroxyl group and polymerizable unsaturated bond per molecule, the hydroxyl group acting as a functional group to react with crosslinking agent. As the monomer (M-2), specifically monoesterification products of acrylic acid or methacrylic acid with $C_{2-10}$ dihydric alcohols are preferred, examples of which include 2-hydroxyethyl acrylate, 2-hydroxyethyl methacrylate, hydroxypropyl acrylate, hydroxypropyl methacrylate, hydroxybutyl acrylate, hydroxybutyl methacrylate and the like.

Other vinyl monomer (M-3) include those other than above monomers (M-1) and (M-2), which contain one polymerizable unsaturated bond per molecule. Specific examples thereof are listed in the following (1)-(8):

(1) monoesterification products of acrylic acid or methacrylic acid with $C_{1-20}$ monohydric alcohol: for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate and the like (2) aromatic vinyl monomer: for example, styrene, α-methylstyrene, vinyltoluene and the like (3) glycidyl-containing vinyl monomer: compounds containing each one of glycidyl group and polymerizable unsaturated bond per molecule, more specifically, glycidyl acrylate, glycidyl methacrylate and the like (4) nitrogen-containing alkyl ($C_{1-20}$) acrylate: for example, dimethylaminoethyl acrylate, dimethylaminoethyl methacrylate and the like (5) polymerizable unsaturated bond-containing amide compound: for example, acrylic amide, methacrylic amide, N,N-dimethylacrylamide, N-butoxymethylacrylamide, N-methylolacrylamide, N-methylolmethacrylamide, diacetoneacrylamide and the like (6) vinyl compound: for example, vinyl acetate, vinyl propionate, vinyl chloride and the like (7) polymerizable unsaturated bond-containing nitrile compound: for example, acrylonitrile, methacrylonitrile and the like (8) diene compound: for example, butadiene, isoprene and the like.

These other vinyl monomers (M-3) can be used either singly or in combination of two or more.

As the polyvinyl compound (M-4), for example, ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinylbenzene, trimethylolpropane triacrylate, methylenebisacrylamide and the like can be named. In these compounds, preferably reactivity of at least two unsaturated bonds contained in each of the compound is not largely different. Aforesaid diene compounds are not included in (M-4).

As the dispersion stabilizer to be used in the emulsion polymerization, anionic emulsifier, nonionic emulsifier, ampho-ion emulsifier and the like can be used. More specifically, examples of anionic emulsifier include fatty acid, alkyl sulfate, alkylbenzene sulfonate, alkyl phosphate and the like can be named. As nonionic emulsifier, for example, polyoxyethylene alkyl ether, polyoxyethylene alkyl allyl ether, polyoxyethylene derivatives, sorbitan fatty acid ester, polyoxyethylene sorbitan fatty acid ester, polyoxyethylene alkylamine, alkyl alkanolamide and the like can be named, and as amphoion emulsifier, for example, alkyl betaine and the like can be named.

Concentration of these emulsifiers is normally within a range of 0.1-10 wt %, preferably 1-5 wt %, based on the solid weight of water-dispersible acrylic polymer particles.

Also as the radical polymerization initiator, for example, ammonium persulfate, 4,4'-azobis(4-cyanobutanoic acid) and the like can be named. The use rate of the initiator is normally within a range of 0.01-10 wt %, preferably 0.1-5 wt %, based on the solid weight of water-dispersible acrylic polymer particles.

The reaction temperature at the time of emulsion polymerization can be normally 60-90° C., and the reaction time, approximately 5-10 hours.

Thus obtained water-dispersible acrylic polymer particles (C-1) conveniently have a hydroxyl value generally within a range of 1-100 mgKOH/g, preferably 5-80 mgKOH/g, for favorable water resistance and curability of the coating film. Also the water-dispersible acrylic polymer particles (C-1) conveniently have an acid value generally within a range of 1-100 mgKOH/g, preferably 5-80 mg KOH/g, for favorable water resistance or curability of the coating film. Furthermore, the water-dispersible acrylic polymer particles (C-1) can have a particle size generally within a range of 10-1,000 nm, preferably 20-500 nm.

The water-dispersible acrylic polymer particles (C-1) are preferably neutralized with basic compound. As the neutralizer for the water-dispersible acrylic polymer particles (C-1), ammonia or water-soluble amino compound such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine, morpholine and the like can be conveniently used.

Water-Dispersible Urethane Polymer Particles (C-2)

Water-dispersible urethane polymer particles (C-2) are customarily and frequently used in the field of paint, for improving physical properties of coating film by, for example, stress alleviating effect. When they are used, for example, for automobile coating, they are effective for improving resistance of coating film to damages incurred by pebbles sprung out with the running car (chipping resistance) and improving adherability.

Water-dispersible urethane polymer particles (C-2) can be obtained, for example, by dispersing or dissolving in water a urethane polymer which is formed through reaction of an active hydrogen-containing compound, compound having in its molecule active hydrogen group, and hydrophilic group, and organic polyisocyanate compound.

As the active hydrogen-containing compound, for example, high molecular polyol, low molecular polyol, polyamine (e.g., those described in JP Hei 3 (1991)-9951A) and the like can be named.

As the high molecular polyol, polyether polyol, polyesterpolyol and polycarbonatepolyol are preferred. Such a high molecular polyol can have an OH equivalent within a range of normally 200-3,000, preferably 250-2,000. As the low molecular polyol, 1,4-butanediol, 3-methylpentanediol, pentaerythritol and trimethylolpropane are preferred. As the polyamine, hexamethylenediamine, isophoronediamine, N-hydroxyethylethylenediamine and 4,4'-diaminodicyclohexylmethane are preferred.

As the compound having active hydrogen and hydrophilic group in its molecule, one having active hydrogen and anionic group or anion-forming group is preferred, examples of which including dihydroxycarboxylic acid (e.g., α,α'-dimethylolpropynoic acid, α,α'-dimethylolbutyric acid and the like), dihydroxysulfonic acid compound (e.g., sodium 3-(2,3-dihydroxypropoxy)-1-propanesulfonate and the like) and diaminocarboxylic acid (e.g., diaminobenzoic acid and the like). As the basic compound for neutralizing the compound, organic base (e.g., triethylamine, trimethylamine and the like) inorganic base (e.g., sodium hydroxide, potassium hydroxide and the like) can be named.

As the organic polyisocyanate compound, for example, isophorone diisocyanate (IPDI), hexamethylene diisocyanate (HDI), 4,4'-dicyclohexylmethane diisocyanate (hydrogenated MDI), 2,4- and/or 2,6-tolylene diisocyanate (TDI), 4,4'-diphenylmethane diisocyanate (MDI), α, α, α', α'-tetramethylxylylene diisocyanate (TMXDI) and the like can be named.

In preparation of the urethane polymer, the reaction of an active hydrogen-containing compound, compound having active hydrogen group and hydrophilic group in its molecule and an organic polyisocyanate compound can be conducted either by one-shot method of reacting the components all at once, or by a multi-stage method comprising, for example, forming a prepolymer with isocyanate terminals by reacting a part of active hydrogen-containing compound (e.g., high molecular polyol) with a compound having active hydrogen group and hydrophilic group in its molecule and an organic polyisocyanate compound, and then reacting the prepolymer with the rest of the active hydrogen-containing compound.

The above reaction can be conducted normally at 40-140° C., preferably 60-120° C. The reaction may be conducted in an organic solvent inert to isocyanate (e.g., acetone, toluene, dimethylformamide and the like), and the organic solvent may be added either during or after the reaction.

The water-dispersible urethane polymer particles (C-2) are obtainable by the steps of neutralizing the hydrophilic group-containing urethane polymer as obtained in the above with a basic compound to form anionic group, and thereafter dispersing or dissolving it in water.

In the occasion of dispersing or dissolving the urethane polymer in water, anionic and/or nonionic surfactant may be concurrently used, where necessary.

Thermosetting water-borne coating compositions according to the present invention can be formulated, for example, by dissolving or dispersing the polyester resin (A) in an aqueous medium containing neutralizing base to form an aqueous varnish, adding to the varnish the crosslinking agent (B) and, where necessary, water-dispersible polymer particles (C) and dispersing the same. In that occasion, the neutralizing base can be used normally within a range as will render pH of the thermosetting water-borne coating composition 7-9.

The blend ratios of the polyester resin (A), crosslinking agent (B) and optionally added water-dispersible polymer particles (C) in the thermosetting water-borne coating composition of the present invention are not strictly limited but are variable over a wide range according to the intended utility of individual coating composition. In general terms, based on the total solid content of the (A), (B) and (C) components, non-volatile component of the polyester resin (A) can be within a range of 5-80 wt %, preferably 5-70 wt %; that of the crosslinking agent (B), 10-60 wt %, preferably 20-55 wt %; and that of the water-dispersible polymer particles (C), 0-80 wt %, preferably 0-70 wt %.

The thermosetting water-borne coating composition of the present invention can further contain, besides the components (A)-(C), other resin(s) where necessary. As the useful resins, for example, acrylic resin, polyester resin, urethane-modified polyester resin, epoxy resin and the like can be named. Of these, hereafter described acrylic resin and polyester resin are preferred.

Acrylic Resin

Acrylic resins which can be synthesized by copolymerization of radical-polymerizable monomers in the accepted manner are meant. Those formed by solution polymerization can be conveniently used. As the organic solvent useful for the solution polymerization, for example, hydrophilic organic solvent such as of propylene glycol type and dipropylene glycol type are preferred. Also for favorable water-dispersibility, acrylic resins having acid groups such as carboxyl group are preferred.

As the radical-polymerizable monomers, those known per se, for example, hydroxyl-containing radical-polymerizable monomers, carboxyl-containing radical-polymerizable monomers and radical-polymerizable monomers other than those can be used.

As examples of hydroxyl-containing radical-polymerizable monomer, 2-hydroxyethyl (meth)acrylate, hydroxypropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono (meth)acrylate, polypropylene glycol mono(meth)acrylate, 2-hydroxy-3-phenoxypropyl (meth)acrylate, 2-hydroxy-3-butoxypropyl (meth)acrylate, monohydroxyethyl (meth) acrylate phthalate and the like can be named.

As the carboxyl-containing radical-polymerizable monomer, for example, acrylic acid, methacrylic acid and the like can be named.

As radical-polymerizable monomers other than the above, for example, styrene, methyl (meth)acrylate, ethyl (meth) acrylate, butyl (meth)acrylate, 2-ethylhexyl (meth)acrylate, lauryl (meth)acrylate, cyclohexyl (meth)acrylate, cyclohexenyl (meth)acrylate, phenoxyethyl (meth)acrylate, phenoxypolyethylene glycol (meth)acrylate, dicyclopentenyl (meth) acrylate, dicyclopentenyloxyethyl (meth)acrylate, isobornyl (meth)acrylate, benzyl (meth)acrylate, ALONICKS M110 (TOAGOSEI Co. Ltd.), N-methylol (meth)acrylamide, N-butoxy (meth)acrylamide, acryloylmorpholine, dimethylaminoethyl (meth)acrylate, N-vinyl-2-pyrrolidone, γ-acryloxypropyltrimethoxysilane and the like can be named.

In the above "(meth)acrylate" means "acrylate or methacrylate".

Generally the acrylic resin preferably has a weight-average molecular weight within a range of 1,000-200,000, in particular, 2,000-100,000. The acrylic resin can also have a hydroxyl value generally within a range of 10-250 mgKOH/g, preferably 30-150 mgKOH/g; and an acid value generally within a range of 10-100 mgKOH/g, preferably 20-60 mgKOH/g.

Polyester Resin

Polyester resin other than the polyester resin (A) of the present invention, which can be synthesized by the means known per se through esterification reaction of polybasic acid with polyhydric alcohol is meant.

Polybasic acid is a compound having at least two carboxyl groups per molecule, examples of which including phthalic acid, isophthalic acid, terephthalic acid, succinic acid, adipic acid, azelaic acid, sebacic acid, tetrahydrophthalic acid, hexahydrophthalic acid, HET acid, maleic acid, fumaric acid, itaconic acid, trimellitic acid and anhydrides of these acids. Polyhydric alcohol is a compound containing at least two hydroxyl groups per molecule, examples of which including ethylene glycol, propylene glycol, butylene glycol, hexanediol, diethylene glycol, dipropylene glycol, neopentyl glycol, triethylene glycol, glycerine, trimethylolethane, trimethylolpropane, pentaerythritol and the like.

Fatty acid-modified polyester resins which are modified with (semi)drying oil fatty acids such as linseed oil fatty acid, coconut oil fatty acid, safflower oil fatty acid, soybean oil fatty acid, sesame oil fatty acid, perilla oil fatty acid, hempseed oil fatty acid, tall oil fatty acid, dehydrated castor oil fatty acid and the like, can also be used as the polyester resin. The quantitative modification is generally preferably not more than 30 wt % in terms of the oil length. The polyester resin may also be partially reacted with monobasic acid such as benzoic acid. It is also permissible, for example, to further react, after the esterification reaction between polybasic acid and polyhydric alcohol, polybasic acid or anhydride thereof such as trimellitic acid or trimellitic anhydride, for introducing acid groups into the polyester resin.

The polyester resin preferably has a weight-average molecular weight generally within a range of 1,000-200,000, in particular, 2,000-50,000. The polyester resin can have a hydroxyl value generally within a range of 10-250 mgKOH/g, preferably 30-150 mgKOH/g; and an acid value generally within a range of 10-100 mgKOH/g, preferably 20-60 mgKOH/g.

The thermosetting water-borne coating compositions of the present invention can contain still other customarily used paint additives, where necessary, such as pigment, curing catalyst, ultraviolet absorber, light stabilizer, surface treating agent, anti-degradation agent, antisagging agent, antisettling agent and the like.

As the pigment, for example, coloring pigment such as titanium oxide, zinc flower, carbon black, cadmium red, molybdenum red, Chrome Yellow, chromium oxide, Prussian blue, cobalt blue, azo pigment, phthalocyanine pigment, quinacridone pigment, isoindoline pigment, threne pigment, perilene pigment and the like; extender such as talc, clay, kaoline, baryta, barium sulfate, barium carbonate, calcium carbonate, silica, alumina white and the like; and effect pigment such as aluminum powder, mica powder, titanium oxide-coated mica powder and the like can be named.

Where the thermosetting water-borne coating composition of the present invention is used as a metallic finish water-borne base coating composition, effect pigment and, where necessary, coloring pigment can be added. Where it is used as an intermediate paint, extender pigment such as barium sulfate, calcium carbonate, clay and the like can be concurrently used with coloring pigment. Such pigment(s) can be formed into a pigment paste with a part of above-described resin component, and added to the remaining aqueous varnish, together with other components. In the preparation of pigment paste, customary additives such as defoaming agent, dispersant, surface-treating agent and the like can be suitably used where necessary.

Suitable blend ratio of such pigment(s) is generally within a range of 1-250 wt parts, in particular, 3-150 wt parts per 100 wt parts of the combined solid content of the components (A), (B) and (C) in the coating composition.

Curing catalyst may also be blended. As the curing catalyst, for example, organometal compound, acid compound and base compound can be used.

As the organometal compound, for example, metallic catalysts such as tetraisopropyl titanate, tetrabutyl titanate, lithium acetate, iron (III) acetylacetonate, zinc 2-ethylhexonate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistannoxane, tetra-n-propyl-1,3-diacetyloxydistannoxane, tetra-n-butyl-1,3-dilauryloxydistannoxane and the like can be named. Of these, organotin compounds such as tin octylate, dibutyltin diacetate, dibutyltin dilaurate and distannoxanes are particularly preferred. Furthermore, when low temperature baking is required, dibutyltin diacetate is conveniently used.

As the acid compound, for example, paratoluenesulfonic acid, dodecybenzenesulfonic acid, dinonylnaphthalenesulfonic acid, dinonylnaphthalenedisulfonic acid, butylphosphoric acid, octylphosphoric acid and the like can be named. Their amine-neutralized products can also be conveniently used.

As the base compound, for example, trimethylamine, triethylamine, dimethylcyclohexylamine, N-tetramethylhexane-1,6-diamine, N-pentamethyldiethylenetriamine, 2-methyl-1,4-diazabicyclo[2,2,2]octane and the like can be named.

Above-named compounds which are useful as the curing catalyst can be used either singly or in combination of two or more. Use ratio of the curing catalyst differs depending on the kind of the compound, while normally suitable ratio is within a range of about 0.05-5 wt parts per 100 wt parts of the combined solid content of (A), (B) and (C) components in the coating composition.

As the ultraviolet absorber, those known per se can be used, examples of which including benzotriazole absorber, triazine absorber, salicylic acid derivative absorber, benzophenone absorber and the like.

Where an ultraviolet absorber is used, its content in the coating composition preferably is within a range of normally 0.1-10 wt parts, in particular, 0.2-5 wt parts, inter alia, 0.3-2 wt parts, per 100 wt parts of combined solid content of (A), (B) and (C) components, for favorable weatherability and yellowing resistance.

As the light stabilizer, those per se known can be used, for example, hindered amine light stabilizer.

Where a light stabilizer is contained, its content in the coating composition can normally be within a range of 0.1-10 wt parts, in particular, 0.2-5 wt parts, inter alia, 0.3-2 wt parts, per 100 wt parts of combined solid content of (A), (B) and (C) components, for favorable weatherability and yellowing resistance.

Coating Film-Forming Method

Substrates to which the thermosetting water-borne coating compositions of the present invention are applicable are subject to no particular limitation while, for example, bodies of various vehicles such as automobiles, two-wheeled vehicles, container vehicles and the like are preferred. The substrates may also be steel sheet such as cold-rolled steel sheet, zinc-plated steel sheet, zinc alloy-plated steel sheet, stainless steel sheet, tin-plated steel sheet and the like; metallic substrate such as aluminum sheet, aluminum alloy sheet, and the like; various plastic materials and the like; which are construction materials of such vehicle bodies.

The substrates may also be metallic surfaces of the vehicle bodies or metallic substrates, which are given a surface treatment such as phosphate treatment, chromate treatment, complex oxide treatment or the like. The substrates may furthermore have undercoat and/or intermediate coat of various electrodeposition paints formed on the vehicle bodies, metallic substrates and the like.

Application means of the thermosetting water-borne coating compositions of the present invention are not particularly limited, but any of air spray coating, airless spray coating, rotary atomizing coating or curtain coat coating, for example, can be used to form wet coating film. These coating means may be conducted under application of static electric charge. Of these, air spray coating and electrostatic coating are preferred. Normally preferred amount of application is such that will give, in terms of cured film thickness, about 10-70 μm-thick coating film.

In the occasions of air spray coating, airless spray coating or rotary atomizing coating, viscosity of the coating composition is preferably adjusted in advance to the viscosity range suitable for such coating means, which is normally about 15-60 seconds at 20° C., as measured with Ford Cup #4 viscometer, suitably using organic solvent and/or water.

Curing of wet coating film is conducted by heating the substrate which has been applied with the thermosetting water-borne coating composition.

The heating can be effected by Per se known heating means, for example, using a drying oven such as hot air oven, electric oven infrared induction heating oven or the like. Suitable heating temperature is normally within a range of 80-180° C., preferably 100-160° C. While the heating time is not critical, it can normally be around 20-40 minutes.

The thermosetting water-borne coating compositions of the present invention can be favorably used as paint for automobiles, in particular, as intermediate paint and colored finish base coating paint.

In their use as intermediate paint, for example, a thermosetting water-borne coating composition of the present invention is applied onto an electrocoated substrate, and after curing the coating film, a finish paint is applied onto the cured coating film and cured. Thus a multi-layered coating film can be formed by 2-coat-2-bake system.

In their use as a colored finish base coating paint, for example, a thermosetting water-borne coating composition of the present invention is applied onto an electrocoated and/or intermediate coated substrate, onto the uncured coating film thereof a clear coating paint is applied without an intervening curing, and the base coat and the clear coat are simultaneously cured, to form a multi-layered coating film by 2-coat-1-bake system.

It is also possible to form multi-layered film by 3-coat-1-bake system, by the steps of applying a thermosetting water-borne coating composition of the present invention as an intermediate coat; applying onto the uncured coating film, without curing the intermediate coat, another thermosetting water-borne coating composition of the present invention as a colored finish base coating paint; further applying onto the uncured finish base coating paint a clear coating paint; and simultaneously curing the tree-layered coating film.

As the clear coating paint useful in the above, thermosetting clear coating paint known per se can be used, specific examples including organic solvent-diluted paint formed by combining a base resin such as alkyd resin, polyester resin, acrylic resin, silicone resin, fluorinated resin, urethane resin and the like, with suitable curing agent such as amino resin, polyisocyanate compound, blocked polyisocyanate compound, polycarboxylic acid or anhydride thereof, reactive silane compound and the like, according to the kind of reactive functional groups contained in the base resin. As the polyisocyanate compound and blocked polyisocyanate compound, for example, similar compounds to those earlier named in relation to the crosslinking agent (B) can be used. Also as the clear paint, high-solid type using less organic solvent is desirable in consideration of environmental problem and resource saving. Furthermore, water-borne paint or powder paint can also be used.

In particular, acrylic resin/melamine resin system, acrylic resin/polyisocyanate curing agent system, acrylic resin/blocked polyisocyanate curing agent system or acid group-containing resin/epoxy group-containing resin system clear coating paints can be conveniently used.

Hereinafter the present invention is explained more specifically, referring to working examples and comparative examples, it being understood that the invention is not limited to these working examples only. In the following, parts and percentages are both by weight, and the thickness of coating film is based on the cured film.

EXAMPLES

Production Examples of Polyester Resin (A)

Example 1

A reactor equipped with a stirrer, reflux condenser, water separator and thermometer was charged with 273 parts of trimethylolpropane, 200 parts of succinic anhydride and 490 parts of Cardura E10P (Japan Epoxy Resin Co., neodecanoic acid monoglycidyl ester), which were reacted at 100-230° C. for 3 hours (a sample taken at that time had a hydroxyl value of 350 mgKOH/g and a number-average molecular weight of 580). Further 192 parts of trimellitic anhydride was added and condensation reacted at 180° C., to provide a polyester resin 1 having an acid value of 49 mgKOH/g, hydroxyl value of 195 mgKOH/g and number-average molecular weight of 1,500.

Example 2

A reactor equipped with a stirrer, reflux condenser, water separator and thermometer was charged with 236 parts of 1,6-hexanediol, 308 parts of hexahydrophthalic anhydride and 490 parts of Cardura E10P, which were reacted at 100-230° C. for 3 hours (a sample taken at that time had a hydroxyl value of 217 mgKOH/g and a number-average molecular weight of 620). Further 230 parts of trimellitic anhydride was added and condensation reacted at 180° C., to provide a polyester resin 2 having an acid value of 50 mgKOH/g, hydroxyl value of 69 mgKOH/g and number-average molecular weight of 1,900.

Example 3

A reactor equipped with a stirrer, reflux condenser, water separator and thermometer was charged with 273 parts of trimethylolpropane, 292 parts of adipic acid and 490 parts of Cardura E10P, which were reacted at 100-230° C. for 3 hours (a sample taken at that time had a hydroxyl value of 319 mgKOH/g and a number-average molecular weight of 630). Further 192 parts of trimellitic anhydride was added and condensation reacted at 180° C., to provide a polyester resin 3 having an acid value of 48 mgKOH/g, hydroxyl value of 181 mgKOH/g and number-average molecular weight of 2,200.

Example 4

A reactor equipped with a stirrer, reflux condenser, water separator and thermometer was charged with 236 parts of 1,6-hexanediol, 154 parts of hexahydrophthalic anhydride, 100 parts of succinic anhydride and 490 parts of Cardura E10P, which were reacted at 100-230° C. for 3 hours (a sample taken at that time had a hydroxyl value of 229 mgKOH/g and a number-average molecular weight of 580). Further 492 parts of ethylene glycolbis-(anhydrotrimellitate) was added and condensation reacted at 180° C., to provide a polyester resin 4 having an acid value of 47 mgKOH/g, hydroxyl value of 62 mgKOH/g and number-average molecular weight of 1,700.

Example 5

A reactor equipped with a stirrer, reflux condenser, water separator and thermometer was charged with 236 parts of 1,6-hexanediol, 308 parts of hexahydrophthalic anhydride and 490 parts of Cardura E10P, which were reacted at 100-230° C. for 3 hours (a sample taken at that time had a hydroxyl value of 217 mgKOH/g and a number-average molecular weight of 600). Further 288 parts of isophorone diisocyanate was added, followed by 6 hours' reaction at 80° C. Thereafter 127 parts of trimellitic anhydride was added, followed by an hour's condensation reaction at 180° C. to provide a polyester resin 5 having an acid value of 48 mgKOH/g, hydroxyl value of 30 mgKOH/g and number-average molecular weight of 1,300.

Comparative Example 1

A reactor equipped with a stirrer, reflux condenser, water separator and thermometer was charged with 109 parts of trimethylolpropane, 142 parts of 1,6-hexanediol, 126 parts of hexahydrophthalic anhydride and 120 parts of adipic acid. The temperature was raised, consuming 3 hours for raising it from 160° C. to 230° C., and the charged components were condensation reacted at 230° C. for 4 hours. Then further 46 parts of trimellitic anhydride was added to introduce carboxyl groups into the resulting condensation reaction product, and reacted at 180° C. for an hour. Thus a polyester resin 6 having an acid value of 49 mgKOH/g, hydroxyl value of 140 mgKOH/g and number-average molecular weight of 1,600.

Production Examples of Crosslinking Agent (B)

Production Example 1

After dropping 49 parts of hexamethylene diisocyanate into 51 parts of methyl ethyl ketoxime at 40-60° C., the mixture was heated at 80° C. for an hour to provide a blocked polyisocyanate curing agent solution 1.

Production Example 2

A reaction apparatus equipped with a thermometer, thermostat, stirrer, reflux condenser and a dropping pump was charged with 605 parts of SUMIDUR N-3300 (Sumitomo Bayer Urethane Co., Ltd.: polyisocyanurate containing isocyanurate structure, number-average molecular weight=600, isocyanurate content=21.6%), 413 parts of diethyl malonate and 181 parts of ethyl acetate, and into which 7.0 parts of a methanol solution of 28% sodium hydroxide was added under gaseous nitrogen current. The system was maintained at 60° C. for 12 hours, and then the NCO value was measured. So found isocyanate content was 0.2%. Adding 99 parts of ethyl acetate thereto, a resin solution was obtained. Transferring 505 parts of this resin solution into another similar reaction apparatus, 450 parts of propylene glycol monopropyl ether was added and heated to 90° C. Distilling the solvent off over 2 hours under reduced pressure while maintaining the system temperature at 80-90° C., 624 parts of a blocked polyisocyanate curing agent solution was obtained. The solvent-removing simple trap contained 42 parts of ethanol.

Thus obtained blocked polyisocyanate curing agent solution was diluted with propylene glycol monopropyl ether to provide a blocked polyisocyanate curing agent solution 2 having a solid content of 80%. The number-average molecular weight of the blocked polyisocyanate curing agent was about 3,500.

Production Example of Water-Dispersible Polymer Particles (C)

Production Example 3

A reaction vessel equipped with a thermometer, thermostat, stirrer, reflux condenser and dropping device was charged with 145 parts of deionized water and 1.2 parts of Newcol 562SF[note 1], which were stirred and mixed in gaseous nitrogen current and heated to 80° C. Then 1% of the total amount of the following monomeric emulsion 1 and 5.2 parts of 3% aqueous ammonium persulfate solution were introduced into the reaction vessel and kept at 80° C. for 15 minutes. Thereafter the remainder of the monomeric emulsion 1 was dropped into the reaction vessel over 3 hours, followed by an hour's aging. Then the following monomeric emulsion 2 and 1.5 parts of 3% aqueous ammonium persulfate solution were dropped into the reaction vessel over 2 hours, followed by an hour's aging. Subsequently the system was cooled to 30° C. under slow addition of 89 parts of 1.5% aqueous dimethylethanolamine solution, discharged while being filtered through a 100-mesh nylon cloth, to provide water-dispersible acrylic polymer particles 1 (solid content=25.2%) having an average particle diameter of 100 nm, acid value of 30.7 mgKOH/g and hydroxyl value of 22.1 mgKOH/g.

(note 1) Newcol 562SF: tradename, Nippon Nyukazai Co., Ltd.: ammonium polyoxyethylene alkylbenzenesulfonate, active ingredient=60%

Monomeric emulsion 1: Mixing and stirring 94.3 parts of deionized water, 17 parts of methyl methacrylate, 80 parts of n-butyl acrylate, 3 parts of allyl methacrylate and 1.2 parts of Newcol 562SF, monomeric emulsion 1 was obtained.

Monomeric emulsion 2: Mixing and stirring 39 parts of deionized water, 15.4 parts of methyl methacrylate, 2.9 parts of n-butyl acrylate, 5.9 parts of hydroxyethyl acrylate, 5.1 parts of methacrylic acid and 0.5 part of Newcol 562SF, monomeric emulsion 2 was obtained.

Preparation of Thermosetting Water-Borne Coating Compositions (Water-Borne Intermediate Paint)

Example 6

To 60 parts of the polyester resin 1 as obtained in Example 1, 40 parts of the blocked polyisocyanate compound solution 1 as obtained in Production Example 1, 70 parts of JR-806 (Tayca Corporation; rutile type titanium oxide), 1 part of CARBON MA-100 (Mitsubishi Chemicals, Inc.; carbon black), 30 parts of Barium Sulfate B35 (Sakai Chemical Industry Co., Ltd.; barium sulfate) and 10 parts of MICRO ACE S-3 (Nippon Talc Co.; fine powdery talc) were added under stirring, and together dispersed and mixed. Dimethylamino-ethanol and deionized water were further added to adjust pH of the mixture to 8.5 and the viscosity, to 40 sec/Ford Cup No. 4 to provide a water-borne intermediate paint 1.

Example 7

Example 6 was repeated except that the polyester resin 1 was replaced with the polyester resin 2 as obtained in Example 2, to provide a water-borne intermediate paint 2.

Example 8

Example 6 was repeated except that the polyester resin 1 was replaced with the polyester resin 3 as obtained in Example 3, to provide a water-borne intermediate paint 3.

Example 9

Example 6 was repeated except that the polyester resin 1 was replaced with the polyester resin 4 as obtained in Example 4, to provide a water-borne intermediate paint 4.

Example 10

Example 6 was repeated except that the polyester resin 1 was replaced with the polyester resin 5 as obtained in Example 5, to provide a water-borne intermediate paint 5.

Example 11

Example 6 was repeated except that the 40 parts of blocked polyisocyanate compound solution 1 was replaced with 100 parts of BAYHYDUR VP LS2310 (Sumika Bayer Urethane Co., Ltd.; water-dispersible blocked aliphatic polyisocyanate curing agent, solid content=40%), to provide a water-borne intermediate paint 6.

Example 12

Example 11 was repeated except that the 100 parts of BAYHYDUR VP LS2310 was changed to 75 parts and 12.5 parts of CYMEL 325 (Mitsui Cytec Industries Co.; methyl/butyl mixed etherified melamine resin, solid content=80%) was added, to provide a water-borne, intermediate paint 7.

Example 13

To 50 parts of the polyester resin 1 as obtained in Example 1, 50 parts of BAYHYDUR VP LS2310, 12.5 parts of Cymel 325, 54 parts of U-COAT UX-8100 (Sanyo Kasei Kogyo Co.; an aqueous polyether urethane resin emulsion, solid content=37%), 70 parts of JR-806, 1 part of CARBON MA-100, 30 parts of Barium Sulfate B35 and 10 parts of MICRO ACE S-3 were added under stirring and together dispersed and mixed. Dimethylaminoethanol and deionized water were further added to adjust pH of the mixture to 8.4 and the viscosity, to 40 seconds/Ford Cup No. 4 to provide a water-borne intermediate paint 8.

Comparative Example 2

Example 6 was repeated except that the polyester resin 1 was replaced with the polyester resin 6 as obtained in Comparative Example 1, to provide a water-borne intermediate paint 9.

Preparation of Thermosetting Water-Borne Coating Compositions (Water-Borne Colored Finish Base Coating Compositions)

Example 14

To 30 parts of the polyester resin 1 as obtained in Example 1, 38 parts of Cymel 325 and 159 parts of the water-dispersible acrylic polymer particles 1 (solid content=25.2%) as obtained in Production Example 3 were added under stirring. Thereafter ALUMIPASTE GX180A (Asahi Kasei Chemicals Corp.; aluminum flake paste) of an amount corresponding to 20 parts of aluminum pigment was added under stirring and together mixed and dispersed. Further adding dimethylethanolamine and deionized water to adjust pH of the system to 8.0 and the viscosity, to 40 seconds/20° C./Ford Cup No. 4, a water-borne colored finish base coating composition 1 was obtained.

Example 15

Example 14 was repeated except that the polyester resin 1 was replaced with the polyester resin 2 as obtained in Example 2, to provide a water-borne colored finish base coating composition 2.

Example 16

Example 14 was repeated except that the polyester resin 1 was replaced with the polyester resin 3 as obtained in Example 3, to provide a water-borne colored finish base coating composition 3.

Example 17

Example 14 was repeated except that the polyester resin 1 was replaced with the polyester resin 4 as obtained in Example 4, to provide a water-borne colored finish base coating composition 4

Example 18

Example 14 was repeated except that the polyester resin 1 was replaced with the polyester resin 5 as obtained in Example 5, to provide a water-borne colored finish base coating composition 5.

Example 19

Example 14 was repeated except that the 159 parts of water-dispersible acrylic polymer particles 10 (solid content=25.2%) was changed to 119 parts and further 12.5 parts of the blocked polyisocyanate compound solution 2 as obtained in Production Example 2 was added, to provide a water-borne colored finish base coating composition 6.

Example 20

Example 14 was repeated except that the 159 parts of water-dispersible acrylic polymer particles 10 (solid content=25.2%) was changed to 119 parts and further 25 parts of SUPERFLEX 410 (tradename, Dai-ichi Kogyo Seiyaku Co., Ltd.; aqueous polycarbonate urethane resin, solid content=40%) was added, to provide a water-borne colored finish base coating composition 7.

Comparative Example 3

Example 14 was repeated except that the polyester resin 1 was replaced with the polyester resin 6 as obtained in Comparative Example 1, to provide a water-borne colored finish base coating composition 8.

Preparation of Test Panels 1

Using each of the water-borne intermediate paints 1-9 as obtained in Examples 6-13 and Comparative Example 2, test panels were prepared in the following manner.

Palbond #3020 (tradename, Nihon Parkerizing Co.; zinc phosphate-treating agent)-treated cold-rolled steel sheets were electrocoated with ELECRON GT-10 (tradename, Kansai Paint Co.; cationic electrodeposition paint) to a film thickness of 20 μm and baked at 170° C. for 30 minutes. The steel sheets with the electrodeposited coating film formed thereon were used as the substrate.

On the substrate, those water-borne intermediate paints 1-9 as prepared in above Examples and Comparative Example were applied to each a film thickness of 35 μm, left standing for 2 minutes, pre-heated at 80° C. for 5 minutes, and cured by heating at 140° C. for 20 minutes. Then onto the water-borne intermediate paint films MAGICRON TB-515 (tradename, Kansai Paint Co.; acryl-melamine resin type solvent-borne finish base coating paint) was coated to a film thickness of 15 μm, left standing at room temperature for 3 minutes, and onto the uncured coated surface MAGICRON TC-71 (tradename, Kansai Paint Co.; acryl-melamine resin type solvent-borne top clear paint) was coated to a film thickness of 35 μm. The two coating films were then cured simultaneously by heating at 140° C. for 30 minutes.

Performance Test Results 1

The results of performance tests given to the test panels and water-borne intermediate paints 1-9 as prepared in the above are shown in Table 1. The test methods and evaluation methods were as follows.

Surface Smoothness of Coating Film:
  Appearance of the test panels was visually evaluated:
    ○: all of surface smoothness, gloss and image sharpness were good;
    Δ: either one of surface smoothness, gloss and image sharpness was unsatisfactory;
    x: either one of surface smoothness, gloss and image sharpness was markedly inferior.
Water Resistance:
  The appearance and adherability after 240 hours' immersion in 40° C. deionized water were examined. For evaluation of adherability, X-formed crosscuts were entered in the coating film with a cutter knife to the depth reaching the substrate, cellophane tape was adhered to the crosscut parts and rapidly peeled off. The extent of coming off of the coating film after the removal of the tape was observed:
    ○: no abnormality observed;
    Δ: no external abnormality such as swelling or blistering observed, but peeling occurred;
    x: external abnormalities such as swelling, blistering or the like and coming off of the film concurrently observed.
Paint Stability;
  The condition of each coating composition after ten days' storage at 40° C. was examined:
    ○: good and no problem;
    Δ: viscosity rise in coating composition observed;
    x: marked viscosity rise in coating composition observed.

TABLE 1

|  | Example | | | | | | | | Comparative Example |
|---|---|---|---|---|---|---|---|---|---|
|  | 6 | 7 | 8 | 9 | 10 | 11 | 12 | 13 | 2 |
| Water-borne intermediate paint | 1 | 2 | 3 | 4 | 5 | 6 | 7 | 8 | 9 |
| Surface smoothness of coating film | ○ | ○ | ○ | ○ | ○ | ○ | ○ | ○ | x |

TABLE 1-continued

|  | Example | | | | | | | | Comparative Example |
|---|---|---|---|---|---|---|---|---|---|
|  | 6 | 7 | 8 | 9 | 10 | 11 | 12 | 13 | 2 |
| Water resistance | ○ | ○ | ○ | ○ | ○ | ○ | ○ | ○ | Δ |
| Storage stability | ○ | ○ | ○ | ○ | ○ | ○ | ○ | ○ | Δ |

Preparation of Test Panels 2

Using each of the water-borne colored finish base coating compositions 1-8 as obtained in Examples 14-20 and Comparative Example 3, test panels were prepared in the following manner.

Onto 0.8 mm-thick, zinc phosphate-treated dull steel sheets, ELECRON 9600 (tradename, Kansai Paint Co.; thermosetting epoxy resin cationic electrodeposition paint) was electrocoated to a film thickness of 20 μm, cured by heating at 170° C. for 30 minutes, onto which AMILAC TP-65-2 (tradename, Kansai Paint Co.; intermediate coating paint for automobiles) was air spray coated to a film thickness of 35 μm, and cured by heating at 140° C. for 30 minutes to provide the substrates.

The substrates were coated with those water-borne colored finish base coating compositions 1-8 as obtained in the Examples and Comparative Example to a film thickness of 15 μm, with a rotary electrostatic coating machine, at a discharge rate of 300 cc, rotation number of 25,000 rpm, shaping air pressure of 1.5 kg/cm², gun distance of 30 cm, conveyer speed of 5 m/min and at the booth temperature/humidity of 25° C./75%, left standing for 2 minutes and pre-heated at 80° C. for 3 minutes. Swazol 1000 (Cosmo Oil Co., Ltd.; petroleum-derived aromatic hydrocarbon solvent) was added to MAGICRON TC-71 (tradename, Kansai Paint Co.; acryl-melamine resin type solvent-borne top clear paint) to adjust the viscosity of the mixture to 30 sec./20° C./Ford Cup No. 4, which was applied to the uncured coated surface to a film thickness of 40 μm, with a minibell rotary electrostatic coating machine, at a discharge rate of 200 cc, rotation number of 40,000 rpm, shaping air pressure of 1 kg/cm², gun distance of 30 cm, conveyor speed of 4.2 m/min and booth temperature/humidity of 25° C./75%, left standing for 7 minutes, and heated at 140° C. for 30 minutes to cure the two layers of coating films simultaneously and provide the test panels.

Performance Test Results 2

The results of the performance tests given to the test panels and water-borne colored finish base coating compositions 1-8 as prepared as above-described are shown in Table 2. The test methods and evaluation methods were as follows.

Surface smoothness, water resistance and paint stability of the coating films were tested and evaluated by the methods similar to those described as to the performance test results 1.

IV Value:

IV value was measured with laser type metallic effect meter, ALCOPE LMR-200 (Kansai Paint Co.). IV is an index for whiteness of metallic coating film. The more uniformly the used metallic pigment is oriented in parallel with the coated surface, the whiter becomes the coated surface to give favorable metallic effect. Higher IV value indicates higher degree of whiteness.

Metallic Unevenness:

Degree of metallic unevenness on each test panel was visually evaluated:

○: nearly no metallic unevenness observed;
Δ: a little metallic unevenness observed;
x: metallic unevenness observed in many places.

Solid Content of Paint:

About 2 g of each paint was taken as a sample in an aluminum foil cup of about 5 cm in diameter and the solid weight concentration (%) was measured (solid content-measuring condition: measured after an hour's drying at 110° C.).

TABLE 2

|  | Example | | | | | | | Comparative Example |
|---|---|---|---|---|---|---|---|---|
|  | 14 | 15 | 16 | 17 | 18 | 19 | 20 | 3 |
| Water-borne colored finish base coating composition | 1 | 2 | 3 | 4 | 5 | 6 | 7 | 8 |
| Surface smoothness of coating film | ○ | ○ | ○ | ○ | ○ | ○ | ○ | Δ |
| IV value | 279 | 262 | 274 | 260 | 259 | 277 | 278 | 201 |
| Metallic unevenness | ○ | ○ | ○ | ○ | ○ | ○ | ○ | x |
| Water resistance | ○ | ○ | ○ | ○ | ○ | ○ | ○ | Δ |
| Solid content of paint | 24 | 23 | 24 | 23 | 22 | 26 | 25 | 20 |
| Storage stability | ○ | ○ | ○ | ○ | ○ | ○ | ○ | ○ |

Preparation of Test Panels 3

As for the water-borne intermediate paints as obtained in Example 6 and Comparative Example 2 and the water-borne colored finish base coating compositions as obtained in Example 14 and Comparative Example 3, further the substrate which was prepared in the following manner was used and two kinds of test panels were prepared following the descriptions of Example 21 and Comparative Example 4.

(Substrate)

Onto 0.8 mm-thick, zinc phosphate-treated dull steel sheet, ELECRON 9600 (tradename, Kansai-Paint Co.; thermosetting epoxy resin-type cationic electrodeposition paint) was electrocoated to a film thickness of 20 μm, and heated at 170° C. for 30 minutes to form an electrocoating film, which was used as the substrate.

Example 21

The substrate was coated with the water-borne intermediate paint 1 as prepared in Example 6 to a firm thickness of 35 μm, left standing for 2 minutes and pre-heated at 80° C. for 5 minutes. Onto the uncured coating film of the water-borne intermediate paint, the water-borne colored finish base coating composition 1 as obtained in Example 14 was applied to a film thickness of 15 μm with rotary electrostatic coating machine at a discharge rate of 300 cc, rotation number of 25,000 rpm, shaping air pressure of 1.5 kg/cm², gun distance of 30 cm, conveyor speed of 5 m/min and booth temperature/humidity of 25° C./75%. The coated substrate was left standing for 2 minutes and pre-heated at 80° C. for 3 minutes.

Swazol 1000 was added to MAGICRON TC-71 (tradename, Kansai Paint Co.; acryl-melamine resin type solvent-borne top clear paint) to adjust the viscosity of the mixture to 30 sec./20° C./Ford Cup No. 4, which was applied to the uncured water-borne colored finish base coating-applied surface to a film thickness of 40 μm, with a minibell rotary electrostatic coating machine, at a discharge rate of 200 cc, rotation number of 40,000 rpm, shaping air pressure of 1 kg/cm², gun distance of 30 cm, conveyor speed of 4.2 m/min and booth temperature/humidity of 25° C./75%, left standing for 7 minutes, and heated at 140° C. for 30 minutes to cure the three layers of coating films simultaneously and provide a test panel.

Comparative Example 4

Example 21 was repeated except that the water-borne intermediate paint 1 was replaced with the water-borne intermediate paint 9 as obtained in Comparative Example 2 and the water-borne colored finish base coating composition 1 was replaced with the water-borne colored finish base coating composition 8 as obtained in Comparative Example 3, to provide a test panel.

Performance Test Results 3

The results of the performance tests of the test panels as prepared in the above are shown in Table 3. The test methods and evaluation methods were same to those employed for the performance test results 2.

TABLE 3

|  | Example 21 | Comparative Example 4 |
|---|---|---|
| Water-borne intermediate paint | 1 | 9 |
| Water-borne colored finish base coating composition | 1 | 8 |
| Surface smoothness of coating film | ○ | Δ |
| IV value | 273 | 195 |
| Metallic unevenness | ○ | x |
| Water resistance | ○ | Δ |

The invention claimed is:

1. A thermosetting water-borne coating composition comprising:
(A) a polyester resin having a hydroxyl value within a range of 10-300 mgKOH/g, an acid value within a range of 10-100 mgKOH/g and a number-average molecular weight within a range of 400-6,000, wherein the resin is obtained by the steps of:
reacting (a) a polyhydric alcohol, (b) a polyvalent carboxylic acid and/or a polyvalent carboxylic anhydride and (c) a monoepoxide compound having a chain or ring hydrocarbon group comprising at least 4 carbon atoms, to produce a polyesterpolyol having a hydroxyl value within a range of 50-600 mgKOH/g and a number-average molecular weight within a range of 400-2,000, and
further reacting the polyesterpolyol with (d) a polyvalent carboxylic acid and/or a polyvalent carboxylic anhydride,
wherein the polyester resin has a number-average molecular weight higher than that of the polyesterpolyol by 400-2,000;
(B) a crosslinking agent; and
(C) water-dispersible acrylic polymer particles (C-1) having a core/shell structure of which the core portion is intraparticulately cross-linked.

2. The thermosetting water-borne coating composition according to claim 1, in which the component (a) is a bifunctional or trifunctional alcohol, and the component (b) is a bifunctional or trifunctional carboxylic anhydride.

3. The thermosetting water-borne coating composition according to claim 1, in which the component (c) is a monoepoxide compound having a chain or ring hydrocarbon group comprising at least 6 carbon atoms.

4. The thermosetting water-borne coating composition according to claim 1, in which the polyesterpolyol has a hydroxyl value within a range of 150-500 mgKOH/g and a number-average molecular weight within a range of 400-2,000.

5. The thermosetting water-borne coating composition according to claim 1, in which the component (d) is a tri- or higher-functional polyvalent carboxylic acid and/or a tri- or higher-functional polyvalent carboxylic anhydride.

6. The thermosetting water-borne coating composition according to claim 1, in which the component (d) is at least one compound selected from the group consisting of trimellitic anhydride, ethylene glycol bis(anhydrotrimellitate), 1,3-propanediol bis(anhydrotrimellitate) and pyromellitic anhydride.

7. The thermosetting water-borne coating composition according to claim 1, in which the polyester resin has a hydroxyl value within a range of 10-200 mgKOH/g, an acid value within a range of 20-80 mgKOH/g and a number-average molecular weight within a range of 500-5,000.

8. The thermosetting water-borne coating composition according to claim 1, in which the crosslinking agent (B) is a melamine resin and/or a blocked polyisocyanate compound.

9. The thermosetting water-borne coating composition according to claim 1, comprising 5-80 parts by weight of the component (A) and 10-60 parts by weight of the component (B), per 100 parts by weight of the combined solid content of the components (A) and (B) in the thermosetting water-borne coating composition.

10. The thermosetting water-borne coating composition according to claim 1, wherein the water-dispersible polymer particles (C) are water-dispersible acrylic polymer particles (C-1) having an acid value within a range of 1-100 mgKOH/g and a hydroxyl value within a range of 1-100 mgKOH/g.

11. The thermosetting water-borne coating composition according to claim 1, comprising, as a non-volatile component, 5-80 parts by weight of the component (A), 10-60 parts by weight of the component (B) and 10-80 parts by weight of the component (C), per 100 parts by weight of combined solid content of the components (A), (B) and (C) in the thermosetting water-borne coating composition.

12. A method of forming a multi-layered coating film, comprising applying onto a substrate the thermosetting water-borne coating composition according to claim 1 as an intermediate paint, curing the same, further applying onto the cured coating film a top coating paint and curing the same.

13. An article, which is coated by the method according to claim 12.

14. A method of forming a multi-layered coating film, comprising applying onto a substrate the thermosetting water-borne coating composition according to claim 1 as a base coating paint, further applying onto the uncured coating film a clear coating paint, and thereafter simultaneously curing the base coat and clear coat.

15. The method according to claim 14, wherein the clear coating paint is an acrylic resin/melamine resin system, acrylic resin/polyisocyanate curing agent system, acrylic resin/blocked polyisocyanate curing agent system, or acid group-containing resin/epoxy group-containing resin system paint.

16. An article, which is coated by the method according to claim 15.

17. An article, which is coated by the method according to claim 14.

18. A method of forming a multi-layered coating film, comprising applying onto a substrate the thermosetting water-borne coating composition according to claim 1 as an intermediate paint, applying onto the uncured coating film the thermosetting water-borne coating composition according to claim 1 as a base coating paint, further applying onto the uncured coating film a clear coating paint and simultaneously curing the three-layered coating film of the intermediate coat, base coat and clear coat.

19. The method according to claim 18, wherein the clear coating paint is an acrylic resin/melamine resin system, acrylic resin/polyisocyanate curing agent system, acrylic resin/blocked polyisocyanate curing agent system, or acid group-containing resin/epoxy group-containing resin system paint.

20. An article, which is coated by the method according to claim 19.

21. An article, which is coated by the method according to claim 18.

* * * * *